United States Patent [19]
Siewert et al.

[11] Patent Number: 4,507,005
[45] Date of Patent: Mar. 26, 1985

[54] PIVOT JOINT

[75] Inventors: Robert L. Siewert, Benton Harbor; Edmund K. Varnelis, St. Joseph, both of Mich.

[73] Assignee: Clark Equipment Company, Buchanan, Mich.

[21] Appl. No.: 553,456

[22] Filed: Nov. 21, 1983

[51] Int. Cl.³ .............................................. F16C 11/00
[52] U.S. Cl. ..................................... 403/16; 403/321; 403/162; 29/434
[58] Field of Search ............... 403/161, 162, 163, 158, 403/157, 16, 321; 29/434

[56] References Cited

U.S. PATENT DOCUMENTS

| | | | |
|---|---|---|---|
| 3,841,771 | 10/1974 | Shaukwitz | 403/370 X |
| 4,022,536 | 5/1977 | Piepho et al. | 403/16 |
| 4,096,957 | 6/1978 | Iverson et al. | 214/145 R |
| 4,243,341 | 1/1981 | Kabay et al. | 403/16 |
| 4,398,862 | 8/1983 | Schroeder | 403/162 X |

FOREIGN PATENT DOCUMENTS

WO82/00181  1/1982  PCT Int'l Appl. ................ 403/161

Primary Examiner—Andrew V. Kundrat
Attorney, Agent, or Firm—Kenneth C. Witt

[57] ABSTRACT

A pivot joint mechanism for connecting together two relatively movable members which includes a pair of cone-type locks at the respective ends of a pivot pin which can be readily assembled and tightened to hold all of the internal parts locked in place by means of a single nut on a bolt extending through the pin, and which can be readily disassembled by inserting jack screws in the ends of the mechanism and backing the female locking members out again.

12 Claims, 3 Drawing Figures

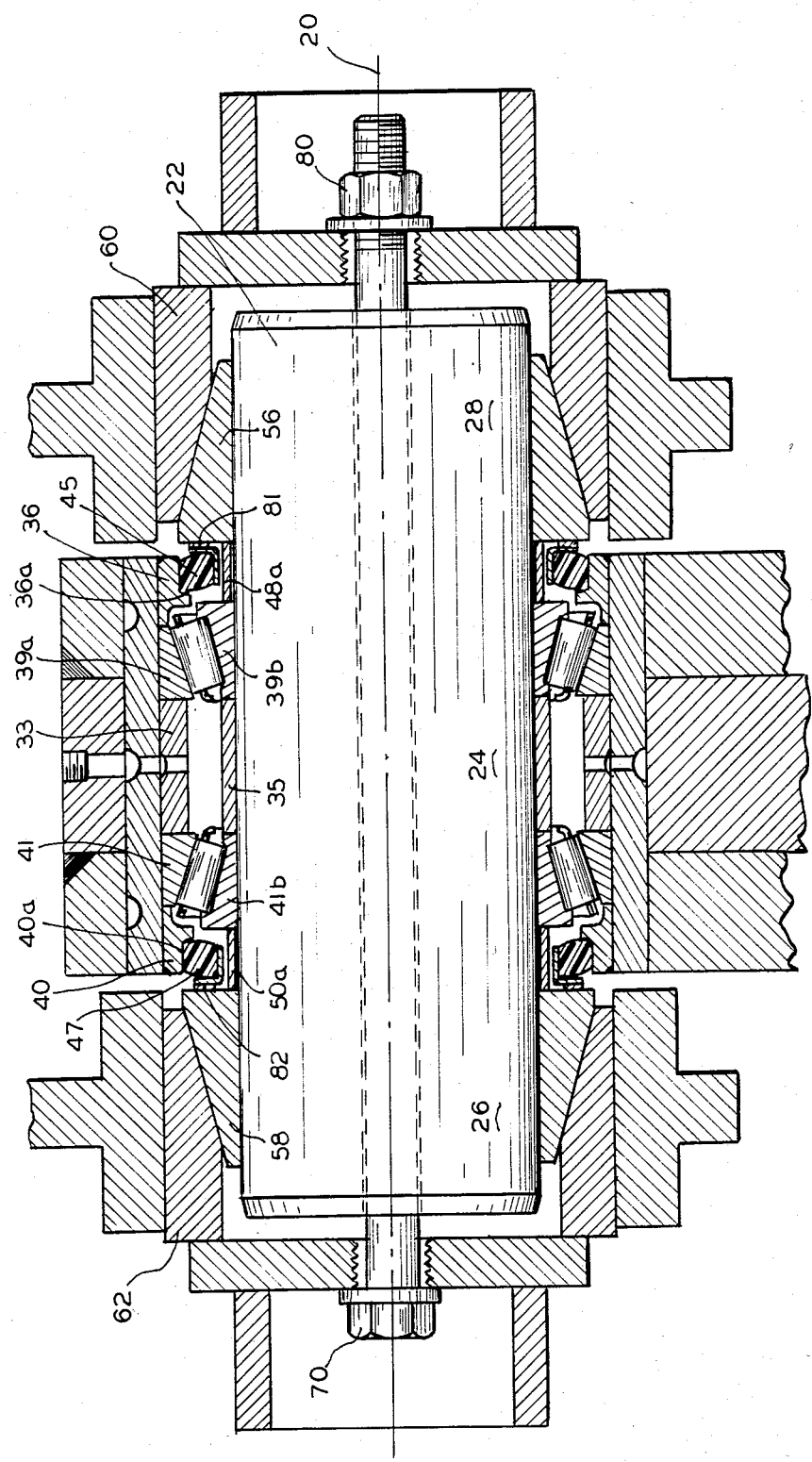

PIVOT JOINT

BACKGROUND OF THE INVENTION

1. Field of the Invention

This invention relates to pivot joint mechanisms for connecting together two relatively movable members which form a portion of a machine. It is particularly useful in earth moving machinery but is not limited to such use.

2. Description of the Prior Art

Numerous pivot joint mechanisms have been disclosed and used in or for earth moving machinery. One of the most troublesome uses of such a mechanism in earth moving machinery is that in which the mechanism pivotally connects a loader bucket to the outer end of a boom structure. Such mechanisms frequently operate under very adverse conditions including the presence of rocks, grit, dirt, water and other things which are found in material which is loaded or excavated by the earth moving machine.

SUMMARY OF THE INVENTION

The pivot joint mechanism of this invention employs a pair of cone-type locks at the respective ends of a pivot pin, which can be readily assembled to hold all of the internal parts in place. Each cone-type lock includes an inner male member and an outer female member, and both locks can be locked by means of a single bolt extending through a bore in the pin and a nut on such bolt. The pivot joint mechanism can be readily disassembled again by inserting jack screws in the female members at the ends of the mechanism and backing the female tapered locking members out again.

BRIEF DESCRIPTION OF THE DRAWING

FIG. 3 is a similar view of a pivot joint mechanism illustrating a third embodiment of the invention.

DESCRIPTION OF THE PREFERRED EMBODIMENTS

Figure 1:
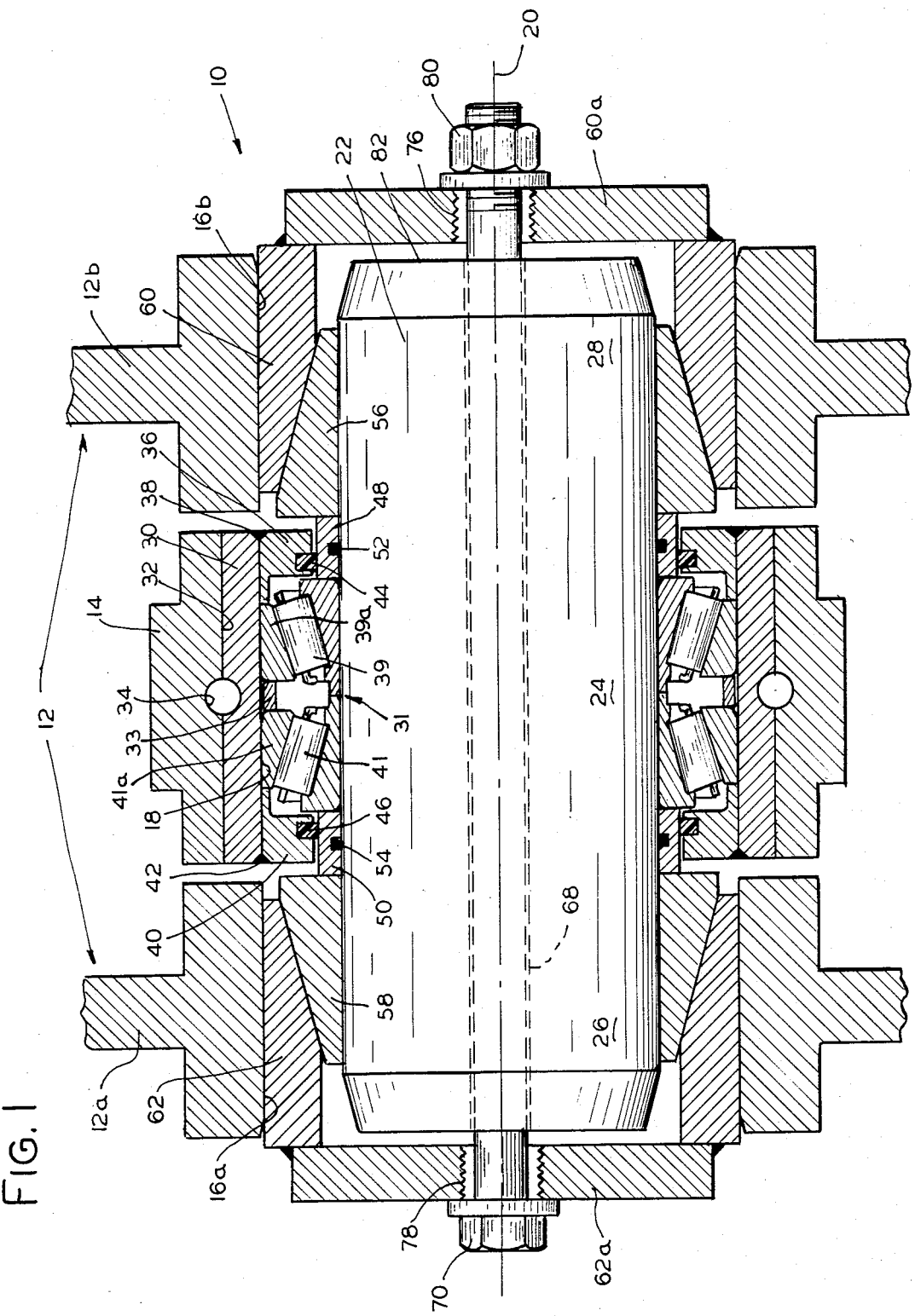
FIG. 1 of the drawing shows an axial sectional view, in section except for the pin, of a pivot joint mechanism according to the present invention.

FIG. 1 of the drawing illustrates a pivot joint mechanism 10 in accordance with the present invention pivotally connecting two relatively movable members 12 and 14. Member 12 is bifurcated and includes two spaced apart plates 12a and 12b. The other member 14 is located, in part, between plates 12a and 12b. Each of said spaced plates 12a and 12b and member 14 has a circular opening therethrough, indicated by the numerals 16a, 18 and 16b respectively, with the centers of such openings aligned along an axis 20 extending transversely to planes coinciding with said movable members; as shown in FIG. 1 opening 18 is in a bushing 30 in member 14.

A cylindrical pivot pin 22, which is the principal structural member of the pivot joint mechanism, is located within openings 16a, 18 and 16b coaxially with axis 20, and is the member on which member 14 is journaled. The pivot pin 22 includes a central portion 24 and end portions 26 and 28 respectively.

In assembling a pivot mechanism in accordance with this invention a preliminary step is to assemble a sub-assembly 31. Such sub-assembly which includes bushing 30 and related parts in done apart from the location shown in the patent drawing. In making sub-assembly 31 a bearing seal retainer 36 is put in place in opening 18 through bushing 30 and secured to bushing 30 in a suitable manner such as by welding at 38. Then an anti-friction bearing, such as a tapered roller bearing 39, is put in place abutting bearing seal retainer 36. Then a spacer 33 is put in place after which a second tapered roller bearing 41 is put in place with the outer race 41a thereof abutting spacer 33. Then a second seal retainer 40 is put in place and is secured to bushing 30 as by welding 42. The two seal retainers abut the outer races 39a 41a of the bearings and are provided with seals 44 and 46 respectively to retain lubricant within bearing sub-assembly 31.

Next the sub-assembly 31 is assembled, preferably with a press fit, in mating opening 32 in member 14, and sub-assembly 31 and member 14 may be further secured together by a bolt (not shown) extending through opening 34. After the foregoing sub-assembly is put in place a pair of spacer rings 48 and 50 including seals 52 and 54 respectively are added. Next two annular male locking cones 56 and 58 are put in place abutting spacers 48 and 50 respectively. Then mating female locking cone members 60 and 62 are put in place so that the inner frustro-conical surface of cone members 60 and 62 are in contact with the outer frustro-conical surfaces of male members 56 and 58 respectively. Each of said female members includes an integral end closure portion, 60a and 62a respectively, which may be secured to the annular portions of said female members by welding.

Pin 28 has an axial bore 68 therethrough and in the assemble condition the pivot joint mechanism includes a bolt 70 extending through said bore. Portions 60a and 62a of the female locking cone members have threaded openings 76 and 78 respectively which are of larger diameter than bore 68. After all the parts of the pivot mechanism have been assembled as described hereinbefore bolt 70 is then passed through bore 68 and nut 80 is tightened on the other end to urge the female cone members against the surfaces of the male cone members and against the surrounding surfaces 16a and 16b respectively in order to lock and hold the pivot joint mechanism in place during operation.

When it is desired to disassemble the pivot mechanism again it is necessary only to remove nut 80 and then remove bolt 70. Then, a jack screw is screwed into mating internal threads in opening 76 until it abuts the outer end 82 of the pin. When said jack screw is turned further the female cone member becomes disengaged from the mating male cone member and the surrounding surface of member 12. After the female cone member at the other end is handled similarly by a jack screw in opening 78 the mechanism can be completely disassembled by removing spacers 48 and 50 and then removing sub-assembly 31 from bushing 30.

Figure 2:
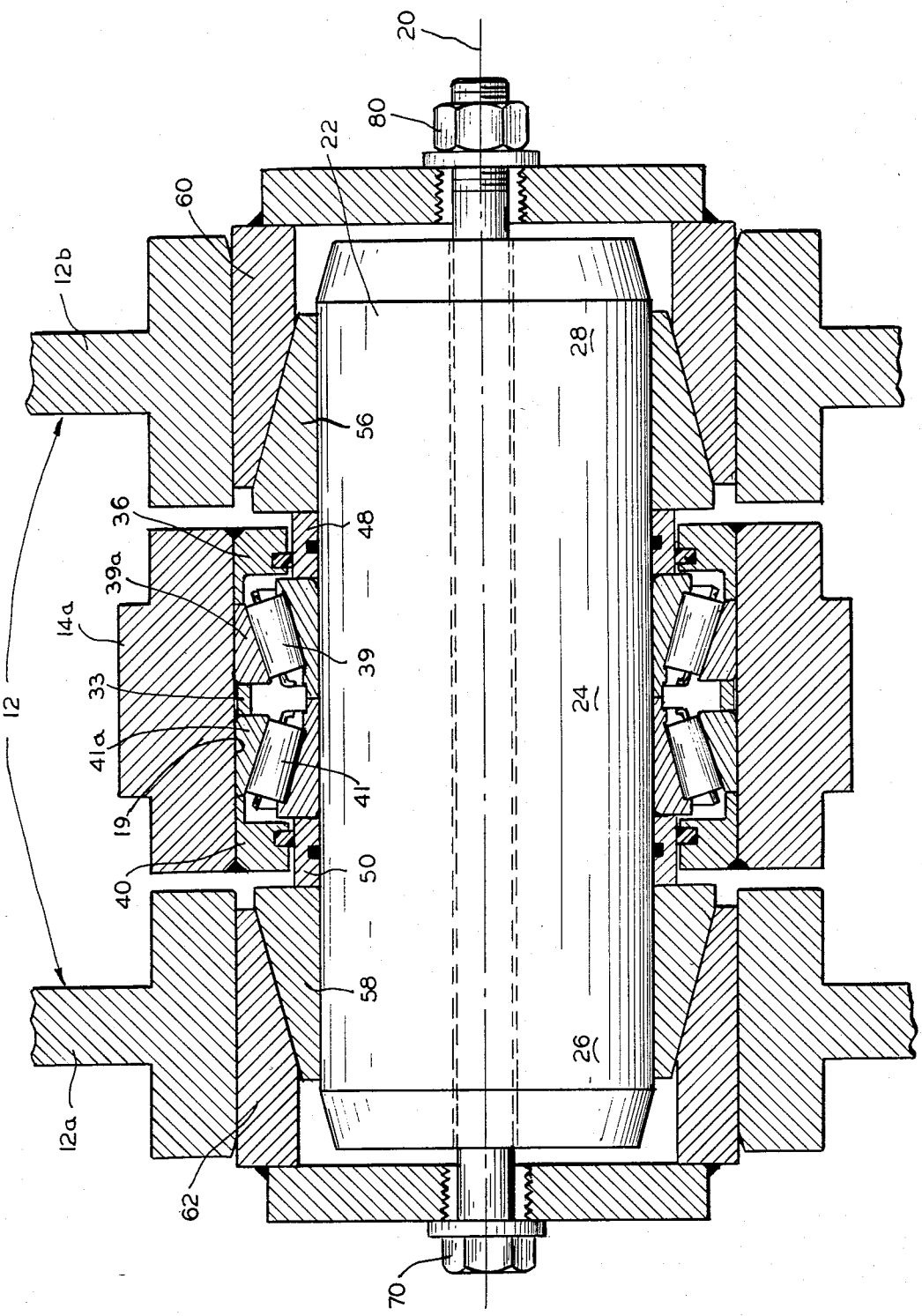
FIG. 2 is a similar view of a pivot joint mechanism illustrating a second embodiment of the invention.

FIG. 2 of the drawing illustrates a second embodiment of the invention wherein bushing member 30 is omitted and member 14a, corresponding to 14 of the first embodiment, has an opening 19 therethrough which may be of the same diameter as opening 18 through the bushing 30 of the first embodiment. Both bearing seal retainers 36 and 40, bearings 39 and 41, and spacer 33 are assembled in member 14a in the same manner as the same parts were installed in bushing 30 in the first embodiment. Then all remaining parts are assembled in the same manner as in the first embodiment.

FIG. 3 of the drawing illustrates a third embodiment of the invention wherein a single pair of annular face seals 45 and 47 replaces the two pairs of seals 44,46 and 52,54 of the other two embodiments. In FIG. 3 parts which are the same or essentially the same as in FIG. 1 have the same identifying numerals. The third embodiment has one bearing spacer not found in the other two embodiments, namely, spacer 35 which is located between the inner races 39b and 41b respectively of the anti-friction bearings. In the third embodiment there are no seals 52 and 54, and as a consequence the affected spacer rings in FIG. 3 are indicated by the numerals 48a and 50a. Seals 45 and 47 are located respectively in sealing contact in a pair of annular recesses 36a and 40a in retainers 36 and 40. The seals are made functionally complete by sealing contact between seal members 45 and 47 respectively and annular seal brackets 81 and 82 on male members 56 and 58 respectively.

The pivot joint mechanism of this invention gives extended bearing lubrication intervals and absorbs thrust loads through the anti-friction bearings. It also eliminates the necessity of shims, eliminates welding to the pin and the use of lock plates. It allows assembly of the invention structure without damage to the seals.

While we have described and illustrated herein preferred embodiments of our invention, illustrating in the first embodiment the best mode contemplated for carrying out the invention, it will be understood by those skilled in the art that modifications may be made. For example, it will be appreciated that a single anti-friction bearing may be used in some pivot joints instead of two as disclosed herein. We intend to cover by the appended claims all such modifications which fall within the true spirit and scope of our invention.

We claim:

1. A pivot joint mechanism for connecting a pair of relatively movbable members, one of said members being bifurcated and having two laterally spaced planar portions, the other of said members having a planar portion located between said spaced planar portions, each of said planar portions having a circular opening therein with the centers thereof aligned along an axis extending transversely to the planes of the planar portions, comprising
   an annular bushing located in the opening in the other of said members,
   a cylindrical pin having a central portion and two end portions and a longitudinal bore therethrough,
   said central portion of said pin located within said bushing,
   a pair of bearing seal retainers also located within said bushing and secured thereto,
   an anti-friction bearing captured between said bearing seal retainers providing for pivotal movement of said other member relative to said pin,
   a pair of spacer rings around said pin and abutting opposite ends of said bearing,
   a pair of male locking members surrounding said two end portions of said pin and abutting said spacer rings respectively,
   a pair of female locking members in contact with said male locking members respectively, and
   means including a tension member extending through said longitudinal bore in the pin for urging said female locking members into a locking relationship with the respective male locking members.

2. A pivot mechanism as in claim 1 wherein said longitudinal bore is coaxial with the axis of said pin.

3. A pivot mechanism as in claim 2 wherein each of said female locking members has an integral end closure portion, and each said end closure portion has a threaded opening therethrough coaxial with said longitudinal bore but of larger diameter, whereby a jack screw may be inserted in each of said threaded openings and by reaction against the ends of said pin be used to disassemble said female locking members respectively.

4. A pivot mechanism as in claim 1 wherein each of said female locking members has an integral end closure portion, and each said end closure portion has a threaded opening therethrough coaxial with said longitudinal bore but of larger diameter, whereby a jack screw may be inserted in each of said threaded openings and by reaction against the ends of said pin be used to disassemble said female locking members respectively.

5. A pivot joint mechanism as in claim 1 wherein there are two anti-friction bearings captured between said bearing seal retainers.

6. A pivot joint mechanism as in claim 5 wherein the outer races of said anti-friction bearings abut said bearing seal retainers respectively, and a spacer is located between and abuts both the outer races of said anti-friction bearings.

7. A pivot joint mechanism as in claim 1 wherein said anti-friction bearing comprises two tapered roller bearings each having an outer race and an inner race, a spacer captured between said outer races, and said outer races abutting said bearing seal retainers respectively.

8. A pivot joint mechanism as in claim 7 wherein said inner races of the tapered roller bearings abut each other.

9. A pivot joint mechanism as in claim 8 wherein a second spacer member is interposed between and abuts both said inner races.

10. A pivot mechanism as in claim 1 wherein each of said male locking members has an inwardly projecting annular bracket to retain a seal member, and a pair of seal members located respectively between said brackets and said bearing seal retainers respectively.

11. A method of assembling a pivot joint mechanism for connecting a pair of relatively movable members, one of said members being bifurcated and having two laterally spaced planar portions, the other of said members having a planar portion located between said spaced planar portions when the joint is assembled, each of said planar portions having a circular opening therein, each of said circular openings being coaxial with an axis extending transversely to the planes of the planar portions, comprising
   preparing a sub-assembly which comprises a bushing and a bearing retainer, a bearing, a spacer, another bearing and another bearing retainer assembled within said bushing, with the bearings preloaded by the securing of both bearing retainers to said bushing,
   locating said sub-assembly in the said circular opening in said other member,
   aligning the opening in said sub-assembly with the openings in said bifurcated members on each side,
   locating coaxially within said circular openings a cylindrical pin having a central portion and two end portions and a longitudinal bore therethrough,
   locating a pair of spacer rings around said cylindrical pin and abutting opposite ends of said bearings,
   locating a pair of male locking members surrounding the two end portions of said pin and abutting said spacer rings respectively, locating a pair of female locking members in contact with said male locking members respectively, and inserting a tension member which extends through said longitudinal bore in said pin urging said female locking members toward each other with sufficient force to hold the pivot joint mechanism together during operation.

12. A method of assembling a pivot joint mechanism as in claim 11 wherein said pair of male locking members each carries an annular seal bracket, comprising locating a pair of seals between each of said seal retainers and the corresponding seal bracket respectively.

* * * * *